(12) United States Patent
Damron

(10) Patent No.: US 6,659,503 B2
(45) Date of Patent: *Dec. 9, 2003

(54) EXTENDABLE TRAILER

(76) Inventor: Tony R. Damron, 6105 Olvida Cir., Ocean Springs, MS (US) 39564

( * ) Notice: Subject to any disclaimer, the term of this patent is extended or adjusted under 35 U.S.C. 154(b) by 0 days.

This patent is subject to a terminal disclaimer.

(21) Appl. No.: 09/999,489

(22) Filed: Dec. 3, 2001

(65) Prior Publication Data

US 2002/0036392 A1 Mar. 28, 2002

Related U.S. Application Data

(63) Continuation-in-part of application No. 09/431,312, filed on Nov. 2, 1999, now Pat. No. 6,332,627.
(60) Provisional application No. 60/107,289, filed on Nov. 6, 1998.

(51) Int. Cl.[7] .................................................. B60S 9/02
(52) U.S. Cl. ........................................ 280/766.1; 180/41
(58) Field of Search .......................... 180/41; 280/763.1, 280/766.1; 414/23

(56) References Cited

U.S. PATENT DOCUMENTS

| | | | | |
|---|---|---|---|---|
| 3,680,836 A | * | 8/1972 | Amelotte et al. | 254/426 |
| 4,061,309 A | * | 12/1977 | Hanser | 254/423 |
| 4,746,133 A | * | 5/1988 | Hanser et al. | 280/6.153 |
| 5,960,662 A | * | 10/1999 | Morello | 72/166 |
| 6,089,603 A | * | 7/2000 | Ackley | 280/765.1 |
| 6,332,627 B1 | * | 12/2001 | Damron | 280/656 |

* cited by examiner

Primary Examiner—Kevin Hurley

(57) ABSTRACT

A trailer having a length varied by the extension of beams from an extendable end. The trailer is further defined by having a saw on the extendable end and a crane for holding trees on the other end, which is typically a low end. The trailer also has, at the extendable end, hydraulicly controlled supports for leveling the trailer at the extendable end. The trailer is also defined as being extendable in width as well as the length.

14 Claims, 10 Drawing Sheets

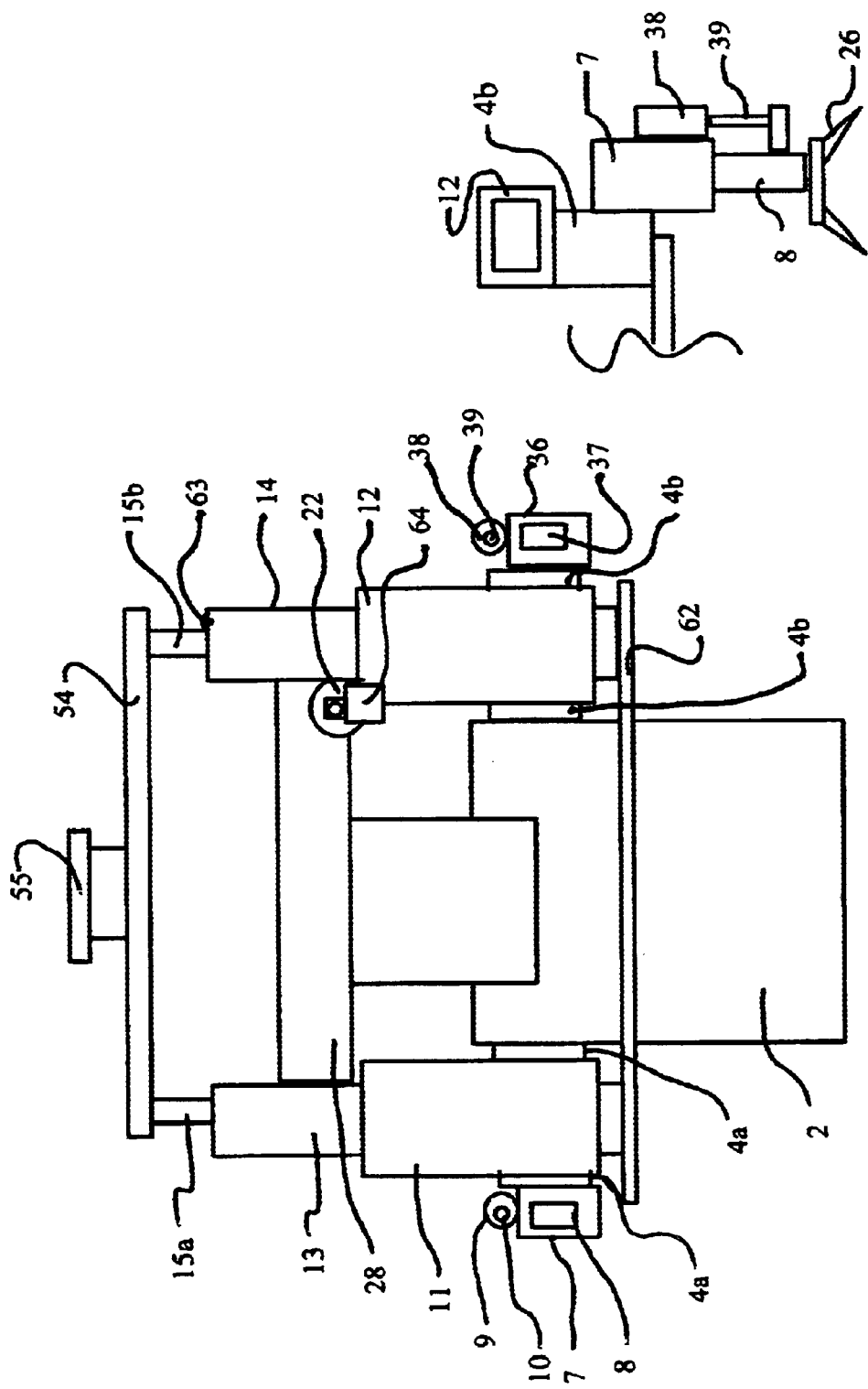

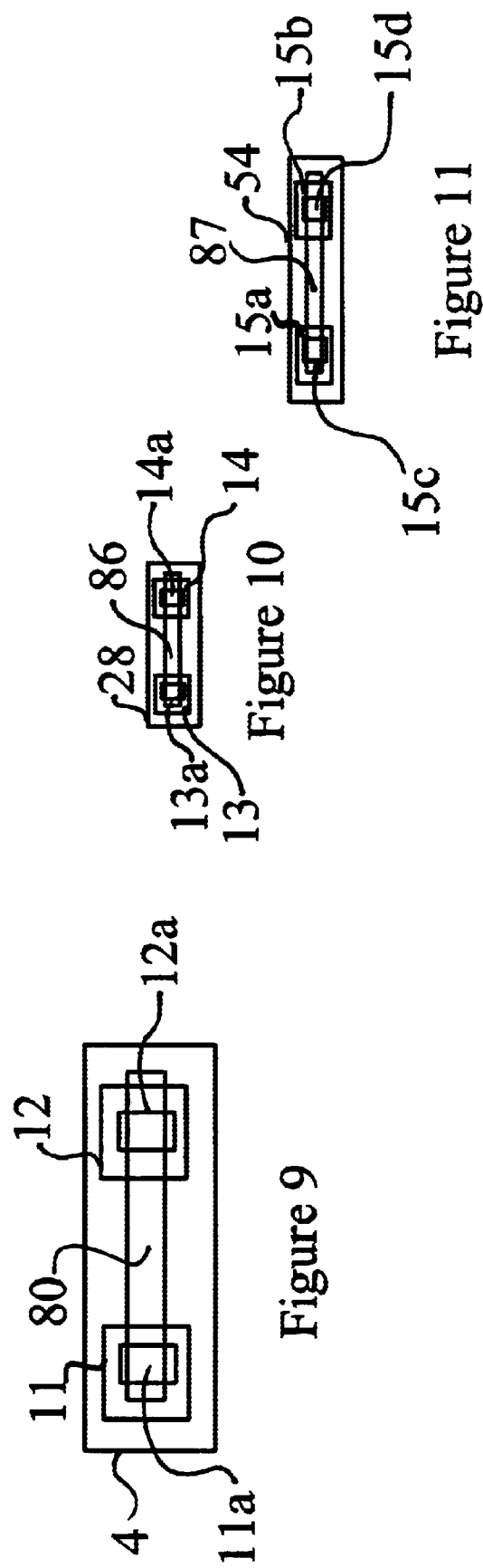

EXTENDABLE TRAILER

PRIORITY

Priority is claimed on U.S. provisional application Ser. No. 60/107,289 filed Nov. 6, 1998 and is a continuation in part of U.S. patent application Ser. No. 09/431,312 filed Nov. 2, 1999, now U.S. Pat. No. 6,332,627.

BACKGROUND OF INVENTION

1. Field of Invention

The invention pertains to trailers. More particularly, the invention applies to de-limbing trailers for removing limbs from trees. More particularly, the invention applies to extendable de-limbing trailers for removing limbs from trees having hydraulic lifters.

2. Prior Art

Trailers are known having two levels with the upper level holding a saw and the lower level holding a tree mover. Trailers having manually operated lifting logs are also well known.

3. General Discussion of the Invention

In the prior art these trailers having two levels for holding a loader with a de-limbing saw. These typically have a wheel level and a raise level as is taught by the present invention. The major benefit of the present invention when compared to the prior art lies in the fact that the present invention is more easily maneuverable while providing the same length as the prior art trailers by having an extendable upper section. An extendable lower section is also taught as an alternate embodiment.

In addition because the length of the space between the log handling device and the de-limber is also adjustable by virtue of the design described herein, the present invention allows for more complete and more efficient de-limbing and trimming of the logs.

It is important to note that in the field these large trailers which are used in the de-limbing process are very difficult to maneuver and providing the design which is more easily maneuverable has a number of time saving benefits.

Because there is in existence technology for diverting the flow of hydraulic fluid, and because limb handling device is run on a hydraulic system, no additional hydraulics are necessary in order to power this unit although they can be powered by a separate motor and a separate hydraulic fluid source.

Because of the nature of the device and the fact that it does not require a tremendous amount of speed in which to operate it may also work on a very low pressure hydraulic source so that the motors to drive it need not be large nor need it take a lot of hydraulic fluid in order to run the unit.

Novel leveling features are also important improvements taught herein, because the traditional method is to place a log and then manually level the supports over the log to support the unit. As the device sinks into soft ground or as the log that it rests on splinters the present invention can adjust the angle caused by this shifting or when the device is set up. This is an important safety feature.

Either by automatically adjusting the level or by adjusting it manually utilizing a reference level within or without the cab, the device is rendered safer because it is held level. This leveling may be automatic by having circuitry designed to run the hydraulic leveling legs to a level position.

When the device becomes sufficiently off level it can shut down the hydraulics. It may be designed to be biased to moving the legs to their shortest, longest or most mid-ranged extensions.

It should be noted that this is not an extensive re-leveling of the tractor since the supports are only one part of the total support of the system. Typically there are outriggers supporting the trailer where the handling device is located as well as the wheels under the trailer where the handling device is located.

The leveling, if automatic, may also control the outriggers to optimize the effect.

It should be noted in the present invention that the extendable part of the trailer described is an unsupported part of the trailer. It does support a fair amount of weight since there is a saw on the end of it and for this reason it has never been suggested that this type of technology be utilized on a trailer with this design and this purpose.

Since the leveling tends to change during the use of vehicle due to the supports or logs on which the supports are mounted either moving into the ground or cracking under strain the need to level the trailer can be important. Further, even with the initial set-up, this leveling technology provides a substantial improvement over current technology.

It is particularly helpful when dealing with scrape hardwood and some pines which have limbs close to the ground.

Two major innovations present with this invention are having a two landing-gear self leveling trailer and having travel trailer with a variable length between the tree lifter and the saw.

In addition since the trailer size is adjustable, it is easier to move a trailer in restricted spaces.

The invention works with less flexing because there is little flex in the rectangular tubing construction versus I-beam construction.

In addition the weight is better distributed because most log loaders are overweight on the trailer wheels and axles. This superior distribution is because the de-limber, which typically weighs six thousand pounds (6,000), can be moved forward. This transfers much of the load to the truck axles where it is needed and this is much safer. In some cases the truck is so light in preexisting models that if the "PKG" is required to stop on a grade it will require another vehicle to push or pull it to get it started.

There are three major lengths of trailers currently being manufactured because of the different log loader booms (the tree lifter arm 30) which are described as being a part of the invention. With this de-limbing trailer, the size of the trailer is adjustable and hence one trailer can be used for several different loader booms.

Additional improvements include having the variable length and leveling controlled by someone in a truck boom located on or near the trailer.

It is therefore an object of this invention to provide a trailer for trimming logs which may be reduced in length for positioning and extended in length in order to have a sufficient length in order to trim logs.

It is a further object of the invention in order to provide for a hydraulicly leveled trailer for de-limbing trees. It is a further object of the invention to provide a trailer with a saw to tree handling device length which is variable in order to allow more of the tree to be efficiently de-limbed.

These and other objects of the invention will become more clear from the drawings and the detailed embodiment in which like numbers correspond to like parts.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIG. 3 shows a top view of an alternate embodiment.

FIG. 4 shows a detail side view of the lifting arrangement described in FIG. 3.

FIG. 9 shows the view 9—9 of FIG. 8.

FIG. 10 shows the view 10—10 of FIG. 8.

FIG. 11 shows the view from 11—11 of FIG. 8.

DETAILED DESCRIPTION OF THE PREFERRED EXEMPLARY EMBODIMENTS

Figure 1:
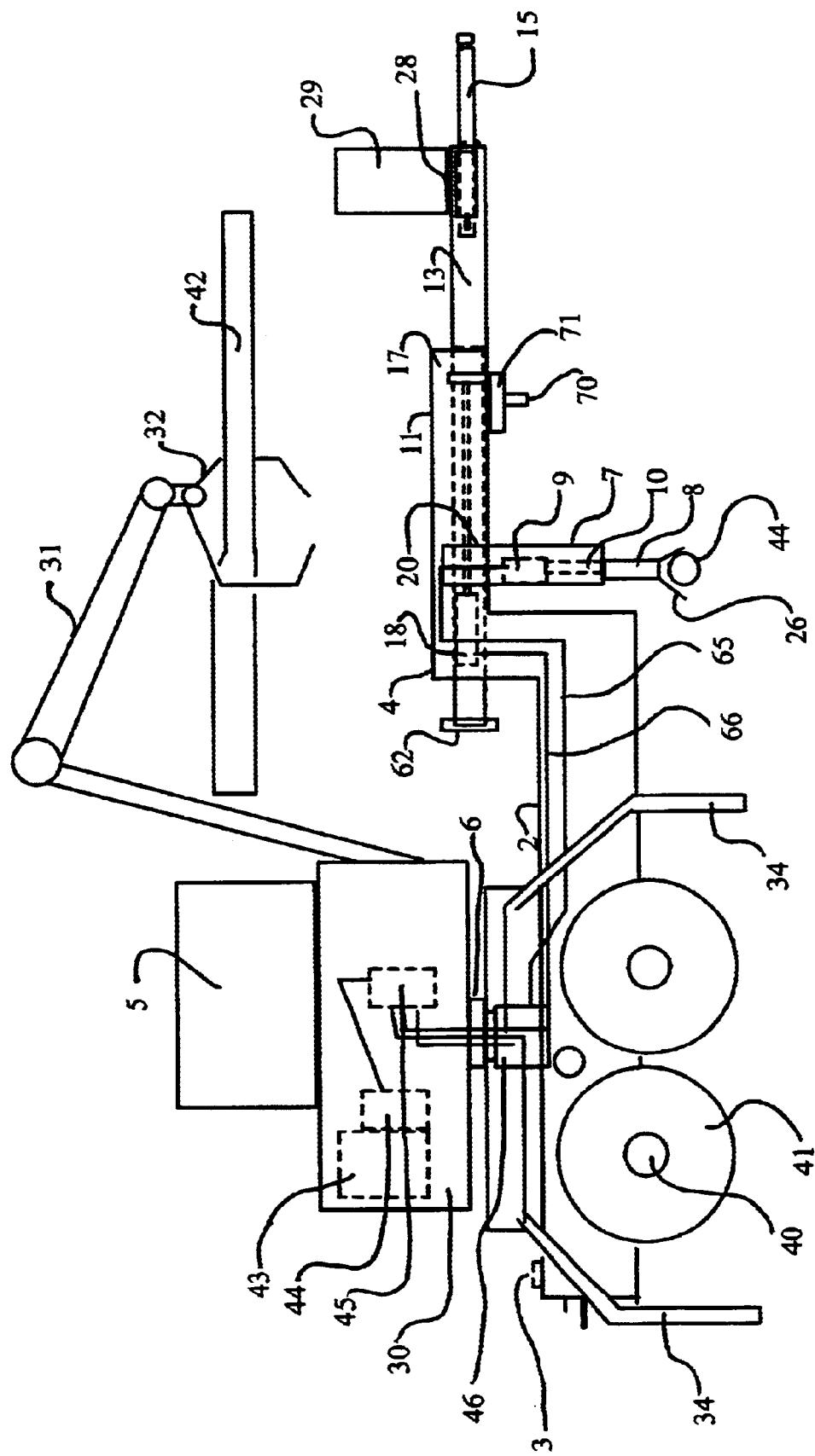
FIG. 1 is a side view of the de-limbing trailer.

The invention as shown in FIG. 1 is a trailer 1 having at least one low arm support 2, and preferably two, which are supported by at least one axle 40 having wheels 41 mounted thereon. The trailer may have brake pressure fluid supplied to the wheels which is activated by the brakes of a vehicle (not shown) pulling the trailer. This trailer is specifically designed for de-limbing operations. De-limbing is the process by which a tree cut from the ground has the top removed (topping) and removing limbs running down the side so that the pole which remains can be loaded onto a separate trailer for movement.

The invention is best described as a trailer for cutting logs utilising saws held at predetermined positions on the trailer 1. To handle the logs 42, a tree lifter 30 is mounted on the low arm support 2 of the trailer. The tree lifter 30 has a tree lifter arm 31 which ends in a grapple 32 which handles the logs 42 to be de-limbed and cut. Out riggers 34 are attached to the low arm supports 2 or tree lifter 30 on either side. These out riggers 34 are hydraulically extended the ground and add additional support when the tree lifter 30 is being used. Above the low arm supports 2 on a hydraulicly driven pivot 6 of the type known in the art is tree lifter 30 which has a control room 5 where the user sits.

The low arm support 2 may a bob tail receiver hitch 3 on one end and a rising brace 4 which connects the low arm support 2 to a high arm on the other end. Alternative, the device may be carried by a king pin 70 mounted by a king pin plate 71 near the exposed end of the fixed tubing, high arm 11.

The high arm 11 is comprised of at least one first high arm 11. In the preferred embodiment, as can be seen by reference to FIG. 1(c) there is a first opening 4a and a second opening 4b defined by the rising brace 4 which receive and secure a first high arm 11 and a second high arm tubing 12 respectively. In this way, the left and right sides of the rising brace 4 each receive one of the two fixed high arms 11 and 12. The king pin plate 70 runs between these two fixed high arms 11 and 12.

In the preferred embodiment, a beam, here, first inner tubing 13 fits into the first high arm 11 and a second inner tubing 14 fits into the second high arm 12. An extending means fits between these for driving the first inner tubing 13 and second inner tubing 14 within and through the first high arm 11 and second high arm 12 respectively. This extending means is preferably a hydraulic cylinder 18 attached to the rising brace 4 between the first high arm 11 and second high arm 12. This cylinder 18 has a piston arm 20 which may be connected to the first inner tubing 13 and second inner tubing 14.

While the preferred embodiment shows a first inner tubing 13 and a second inner tubing 14, it can readily be seen that a similar result may be obtained with a single beam driven from the center of the rising brace 4 in the same fashion.

In the preferred embodiment, this second inner tubing 14 is pushed outward by the same piston arm 20 as the first inner tubing 13, although it is conceivable that a second hydraulic arm could be used. To connect the hydraulic arm to both tubings 13 and 14, the piston arm 20 is attached to a back wall 35 running between the tubings 13 and 14. This back wall 35 may also hold the king pin 70 if the tubings 13 and 14 are strong enough for this type of support.

Figure 1A:
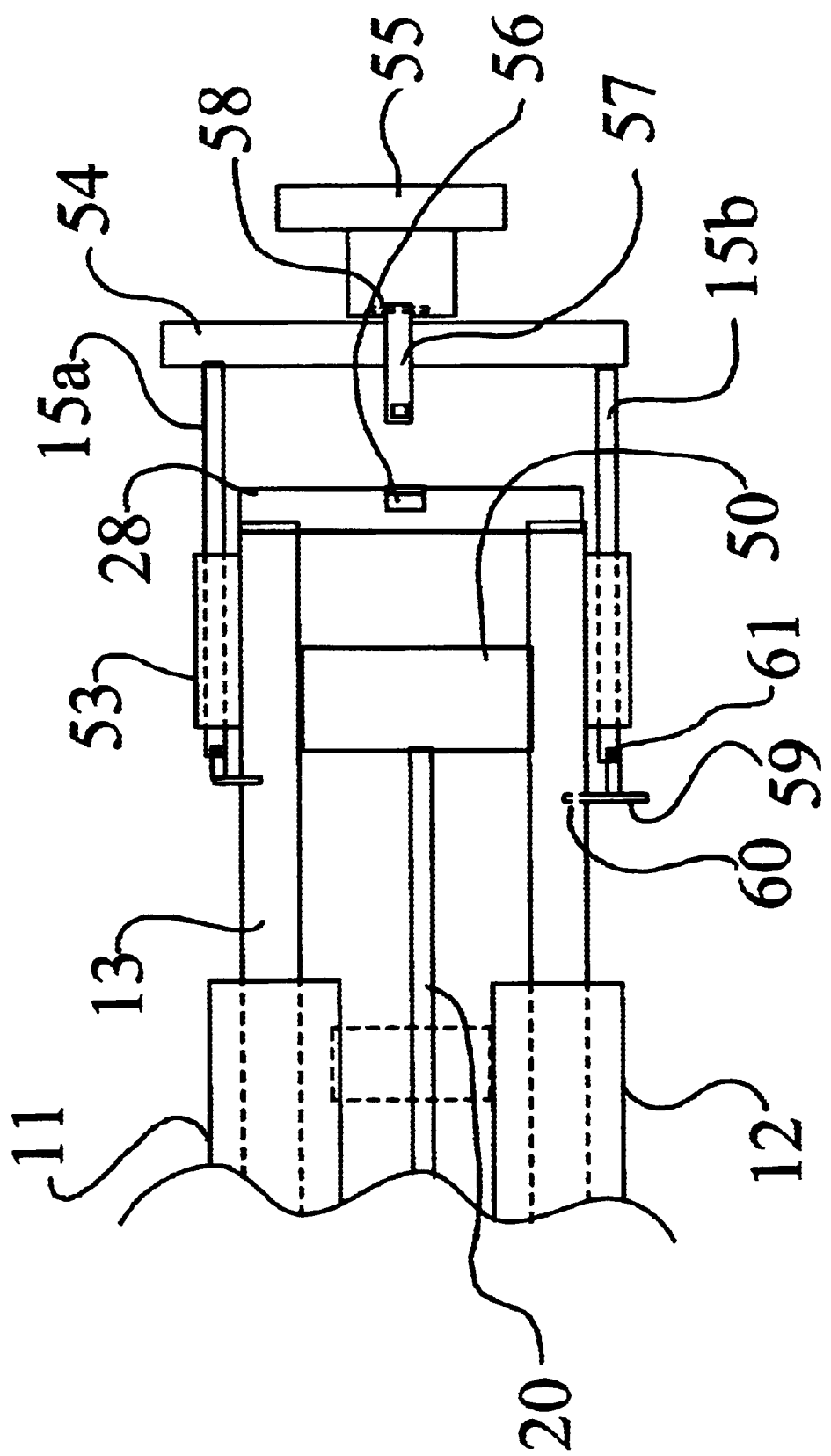
FIG. 1(a) is a detail of the extension of FIG. 1.

As shown in FIG. 1(a), the piston arm 20 may be attached to cross bar 50 which may be attached between the first and second high arm 11 and 12. Forward of the cross bar 50 is the saw mount 28 on which the saw 29 (shown in FIG. 1) may be mounted.

Figure 1B:
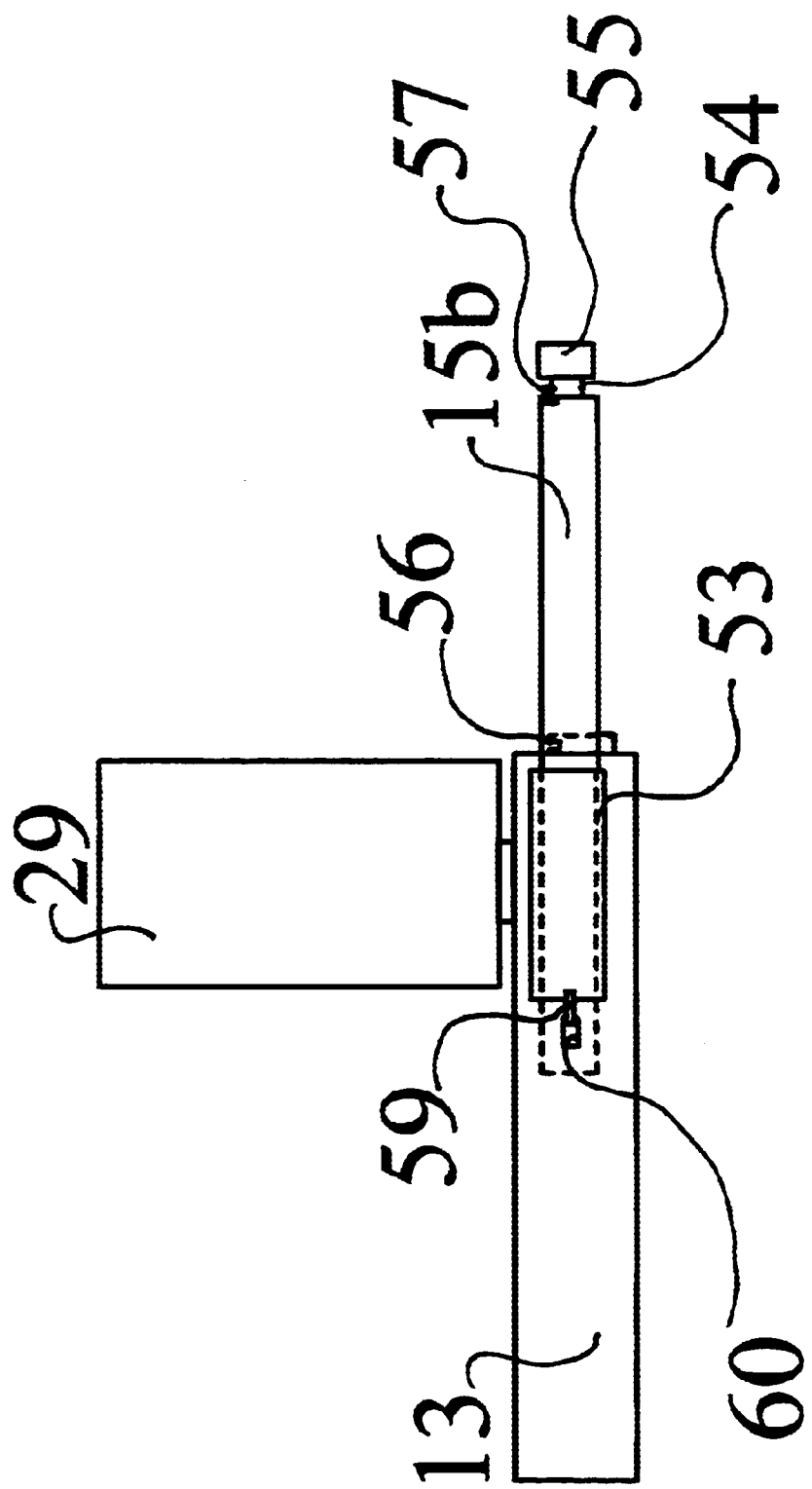
FIG. 1(b) is a side view detail of the extension shown in FIG. 1.

As can be seen from FIG. 1(a) from the top and FIG. 1(b) from the side the left and right pull bar 15a and 15b (respectively) extend from cylinders 53 outside of the inner tubing 13 and 14 on either side. These bars 15a and 15b are joined in front by a cross pull bar 54 which holds a pull attachment 55 of a type known in the prior art.

The cross pull bar 54 may be locked in the retracted position by was of a key 57 pivoting on a pivot 58 into or they may be locket out using a key hole 56 in the mounting plate 28. It may be locked in the extended position by way of keys 59 pivoting on pivots 61 which keys 59 fit into key holes 60 in the inner tubing 13 and 14. The mounting plate 28 is shown in FIG. 1(b) where it extends above the inner tubing 13 and 14 and where it extends in front of inner tubing 13 and 14.

Figure 1C:
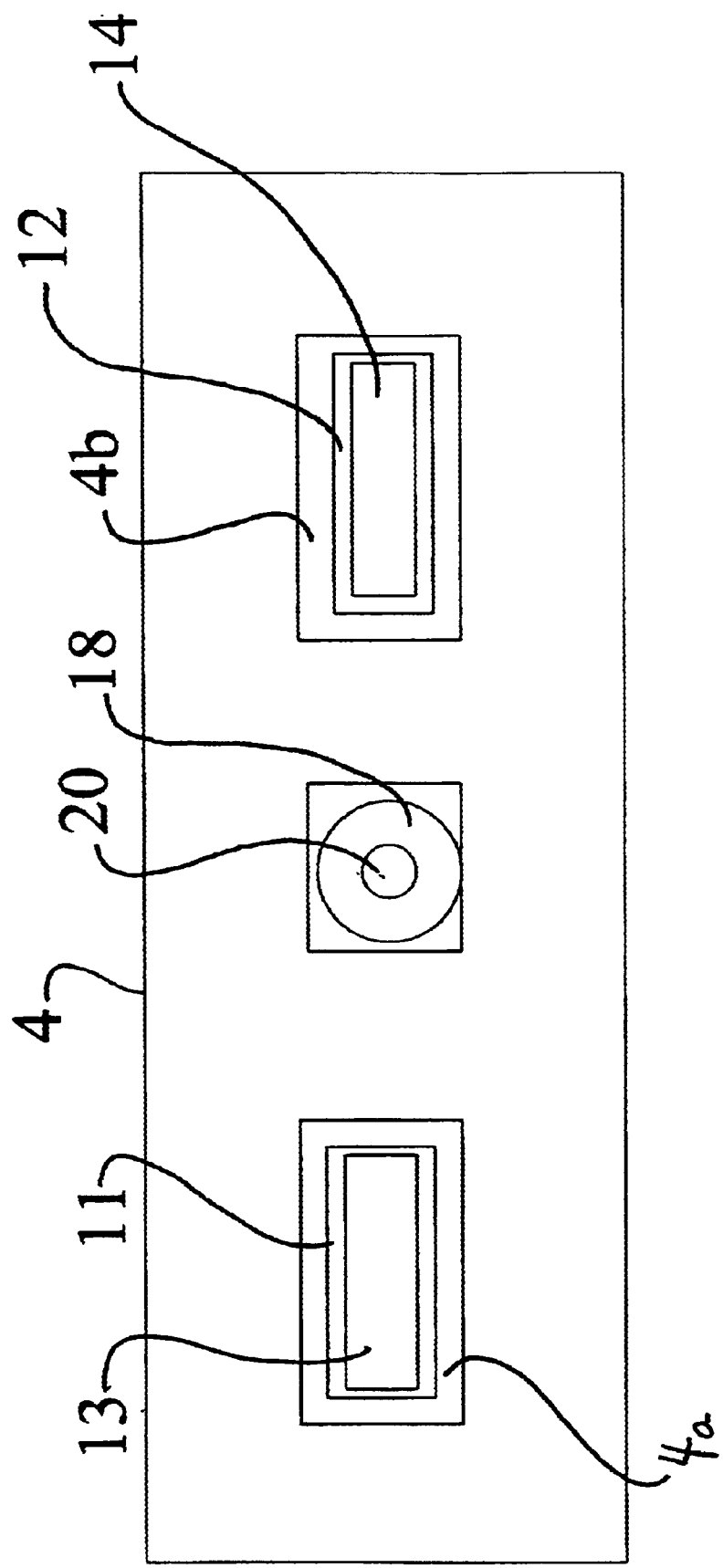
FIG. 1(c) is a cross section of the extension of FIG. 1 through the c—c axis.

FIG. 1(c) shows a cross section of FIG. 1 through the c—c axis. This shows where the center rising brace defines openings 4a and 4b into which the first high arm 11 and second high arm 12 fit. In turn, inner tubing 13 slides within the first high arm 11 and the inner tubing 14 slides within the second high arm 12. It also shows where the piston 18 and piston arm 20 come out of the rising brace 4.

Figure 2:
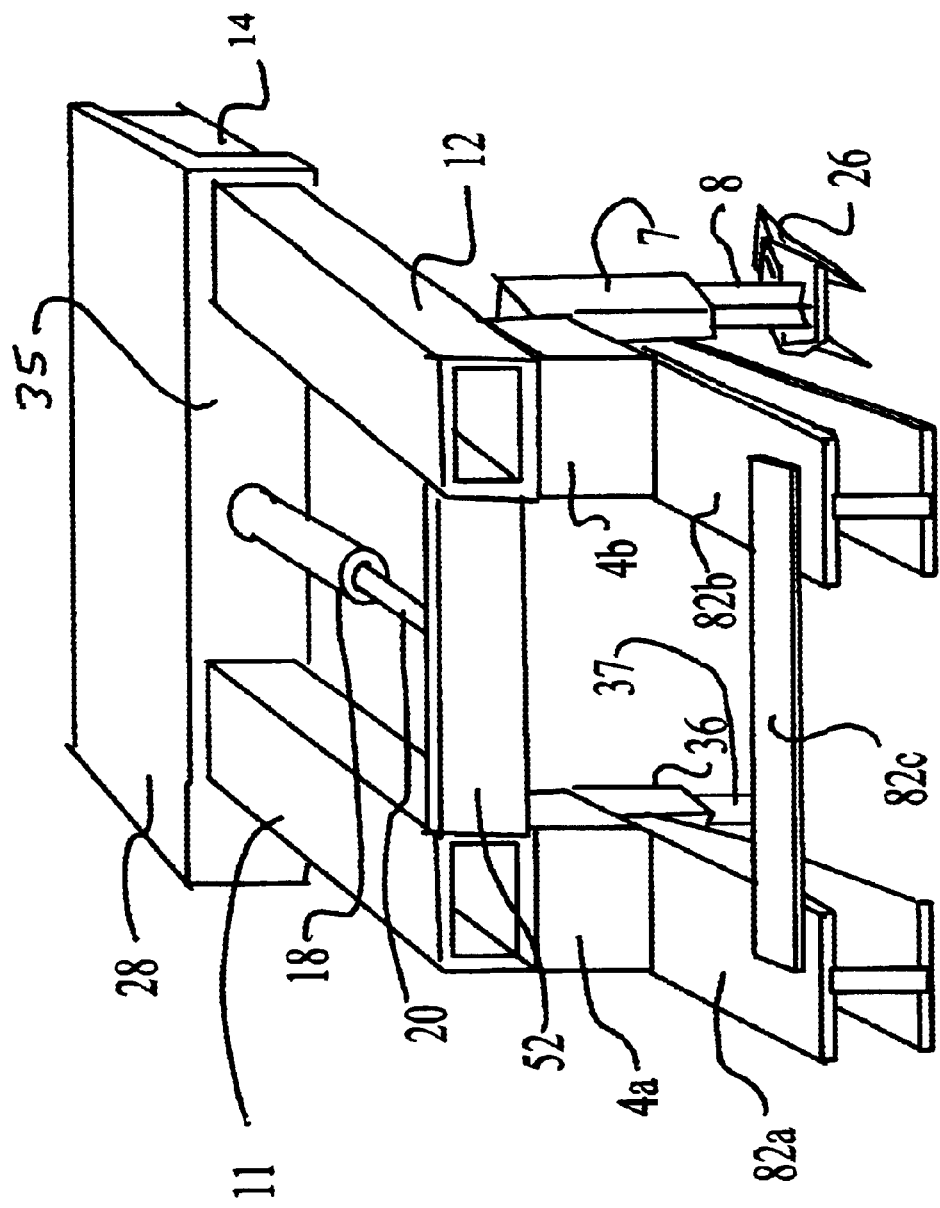
FIG. 2 is a front perspective view of one alternative embodiment.

One alternate embodiment is shown in FIG. 2 where the location of the piston arm 20 and piston 18 are reversed in position. Typically this would be less desirable because more hydraulic line would be necessary. Here, it can be seen that the low arm is comprised of a first I-beam 82a and a second I-beam 82b. A center bar 82c may receive the tree lifter (not shown here) when the trailer is completed. This allows for a trailer of varying length based on the extension added. In this embodiment, the rising brace 4 is made of two separate pieces, first brace 4a supporting first high arm 11 and second brace 4b supporting second high arm 12.

The two inner tubings 13 and 14 fit within the first and second high arm 11 and 12 and are connected by the saw mount 28.

In this way, as the tubings 13 and 14 are drawn into the tubes of the first and second high arms 11 and 12, the saw mount 28 along with a saw 29 mounted onto the saw mount 28, move toward the opening between the first and second high arm 11 and 12. In this way, the extending hydraulic cylinder 18 may be connected directly to the saw mount 28. The piston arm 20 is mounted on brace 52 running between the first brace 4a and second brace 4b.

The hydraulic system for the preferred embodiment comprises: an internal combustion engine 43 driving hydraulic pumps 44 which supply fluid from a reservoir (not shown) under pressure to a set of hydraulic valves 45 controlled by controls located in the cab 5.

The feed lines 6 for the lower hydraulics comprising, cylinders 18 and 19 (and possibly in other embodiments they hydraulics (not shown) for the outriggers 34) pass through a hydraulic swivel 46 which is known in the prior at. Within the prior art, valves are shown in the lower section for distributing hydraulic fluid at a low pressure. Also shown are hydraulic valves in the upper section providing low pressure fluid to lower hydraulics, although not lower hydraulics of the type described herein.

A ladder 43 may be in place to assist climbing into the cab 5.

It can therefore be seen that the arrangement of the cylinder 18, and high arms 11 and 12 and arm 30 forms an extension means for allowing the length of the trailer 1 to be extended or retracted. The extension means so described is at least one hydraulic cylinder and piston having a first end operationally movable away by action of the cylinder from the second end, said first end being mounted onto high arm and the second end being mounted on the extension beam.

Bearings 17 may be used where ever necessary to facilitate the movement of parts.

In the preferred embodiment, shown in FIG. 1, hydraulic cylinder 18 extends the inner tubing 13 and 14.

A pin 70 may be mounted on the front end of the low arm 2 so that the entire unit may be hauled by a truck from the front or on the rear end of the loader low arm 2 near the saw mount 28 on which a de-limber saw 29 may be mounted.

Another embodiment is shown in FIG. 3. FIG. 3 shows how pull bars 15a and 15b may be held within and extend out of the inner tubing 13 and 14. This shows how the pull bars may be fixed or may be extendable manually or by action of hydraulics.

In FIG. 3 hydraulicly driven worm gears 22 may be used in place of hydraulic cylinders to extend the inner tubing 13, 14 and hydraulicly driven gears or wheels 63 may turn against and thereby hydraulically extend the pull bars 15a and 15b.

In FIG. 3, the inner tubing 13 and 14 may be extended by way of a motor 64 turning a wheel 22 against the side of the tubing 14. The wheel may be geared or may be a worm gear of the type known in the art. The motor for this mechanism may be hydraulic or electric. Hydraulic motors would be preferred since the hydraulics are present and since they would typically provide more reliability, power and speed for this application. In this embodiment, it can be seen that a second wheel 63 pushing against extension 15b may be used to extend or retreat the extension 15b and 15a driven by a simile motor (not shown) to that shown as 64. It can be seen, from this description, that any type of motor, hydraulic or otherwise, might be used to extend the length of the trailer or to extend the pull bars 15a and 15b.

Also, in the embodiment shown in FIG. 3, the low arm 2 of the trailer is shown as a single piece, here with the tree lifter 30 removed. It is to be understood that the use of worm gears or wheel driven motors or hydraulic cylinders with arms are illustrative and that commonly known equivalents could be substituted within this disclosure to obtain a like result.

At the front of the inner tubing 13 and 14 a front plate 62 moves toward the front of the trailer 1 and towards the cab 5 when the inner tubing 13 and 14 is retracted. This can serve to hold items in place on the trailer when retracted and prevents the over-extension of the inner tubing 13 and 14 when the trailer 1 is elongated.

Trailer Level Control

As can best be seen by reference to FIGS. 1, 3 and 4, the center rising brace 4 connects low arm 2 to a high arm which preferably is comprised of first high arm 11 and second high arm 12. This brace 4 also receives a left support arm 7 and a right support arm 36. Only a single support arm 7 can be seen in FIG. 1, but reference to the alternate embodiment shown in FIG. 3 shows both arms 7 and 36.

The left support arm 7 has a left extension 8 which may be extended action of hydraulic cylinder 9 pushing hydraulic arm 10 to extend the extension 8 for the left support arm 7. For ease of understanding, reference is made to FIG. 4 which details an alternate embodiment and shows a single support arm 7 and extension 8 having a footing 26. The hydraulic cylinder 9 and arm 10 are shown outside of the support arm 7 for ease of viewing, although it may be internal to the support arm 7. As the arm 10 extends away from the cylinder 9, the trailer is raised. As arm 10 is retracted into the cylinder 9, the trailer is lowered.

The right support arm 36 has a right extension 37 which may be extended by action of the hydraulic fluid in the hydraulic cylinder 38 on the hydraulic arm 39 in an identical fashion so that by action of both support arms 7 and 36 and both extensions 8 and 37, the trailer may be leveled. The left extension 8 and right extension 37 may be extended different lengths so that side to side leveling is possible.

In the preferred embodiment the left and right support arms have log grip footings 26 which can fit over a log support log 44.

By varying the extension length 8 and 37, the trailer may be leveled for better working conditions. While leveling of trailers is not unknown, the use of this hydraulic system provides a novel and unobvious method of leveling and re-leveling the trailer during a logging operation when the trailer can settle of shift. It is also safer and less time consuming than hand leveling or leveling with equipment. An alternative outside of the present invention would replace the hydraulic cylinders 9 and 38 with hand operated jacks which would allow a user to manually adjust the height using a jack instead of hydraulic action. This, however, would not allow for the constant re-adjusting of height from the cab 5, nor would it be as easy and safe.

Figure 5:
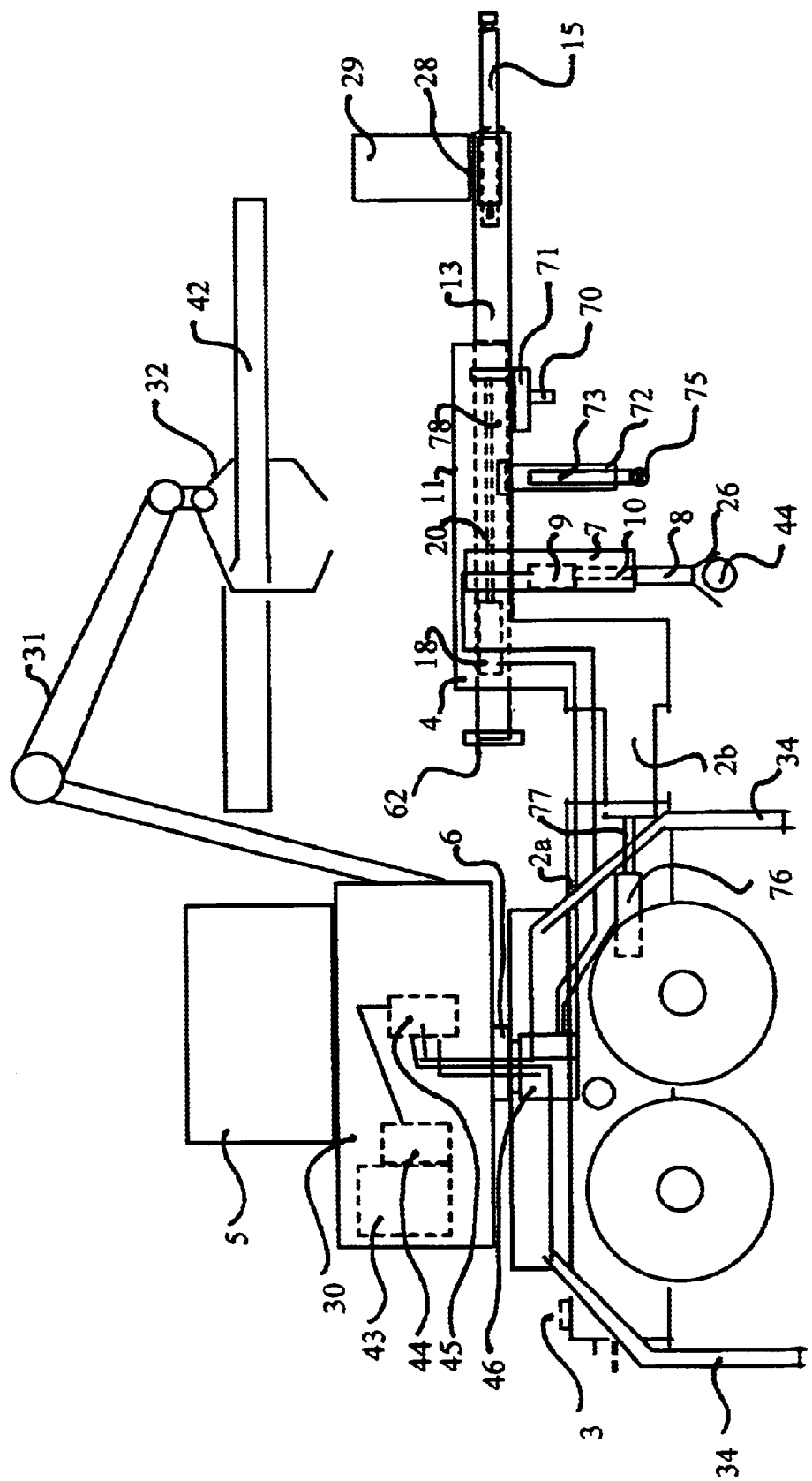
FIG. 5 shows an alternate embodiment of the trailer from FIG. 1 with a lower arm of variable length.
Figure 6:
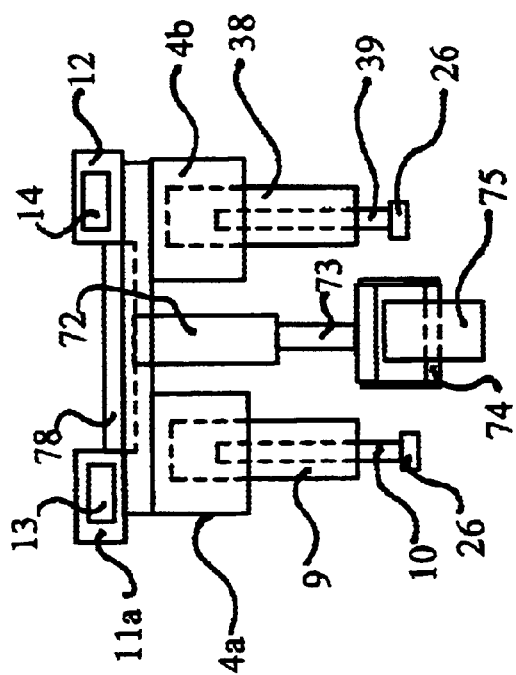
FIG. 6 shows a detail of the third wheel arrangement.
Figure 7:
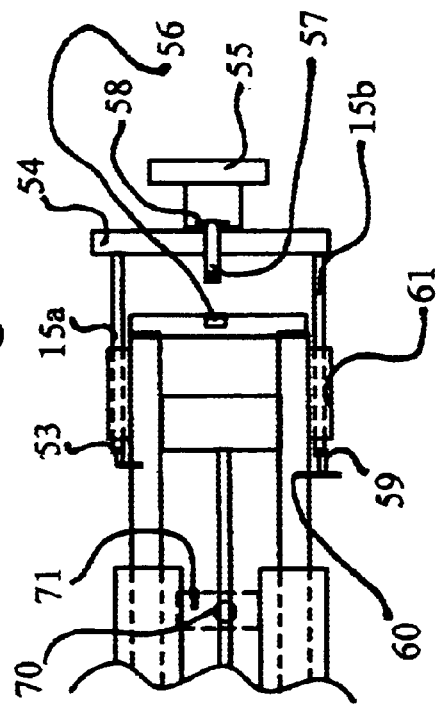
FIG. 7 shows a detail view of one embodiment of the king pin and king pin plate described in the specification.
Figure 8:
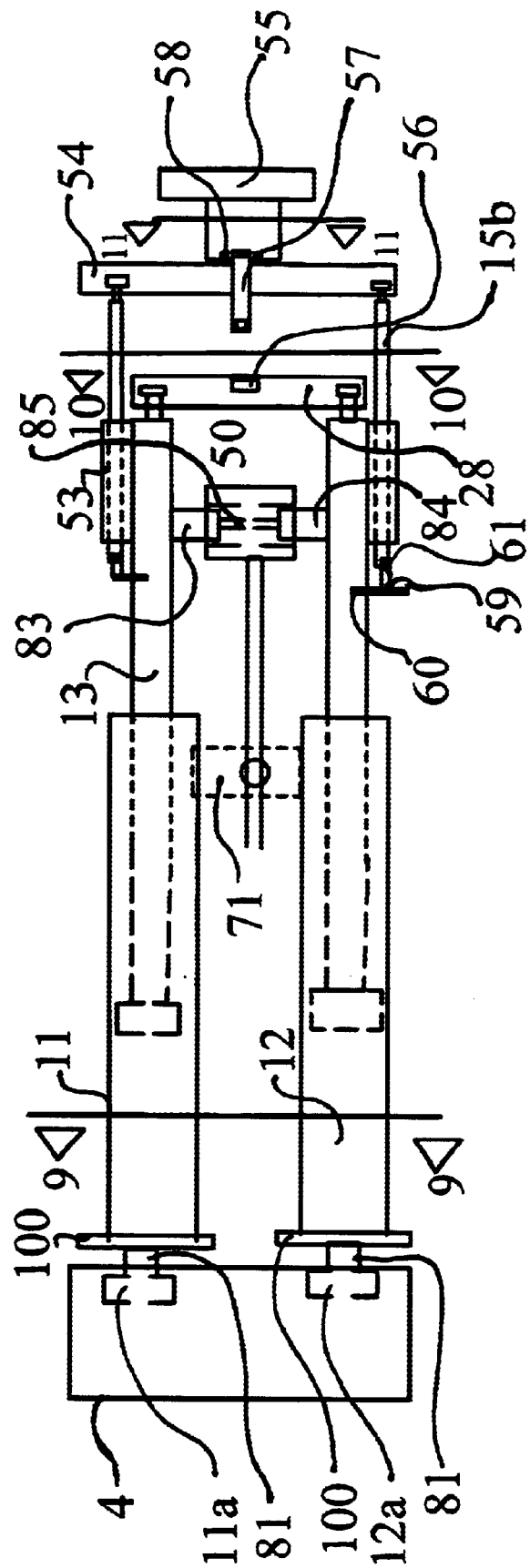
FIG. 8 shows an alternate design wherein the width is varied.

FIGS. 5 and 6 show an alternative embodiment where the low arm 2 of the trailer extends rather than (or in addition to) the high arms 11 and 12.

In these figures mounted between the high arms 11 and 12 there is a middle hydraulic cylinder 72 terminating in a middle piston arm 73 which has a middle axle 74 on which at least one middle wheel 75 rides. This middle cylinder 72 is in front of (though it may be behind) the left and right extensions 8 and 37. A cross beam 78 running between the two high arms 11 and 12 could secure this middle cylinder 72 if the two high arms 11 and 12 were extended together. If extended separately, then the cylinder might have to be mounted to a single high arm. Because the high arms have a saw mounted across them in the preferred embodiment, the cross beam 78 would be available. The middle cylinder 72, piston arm 73 and wheel 75 serves two purposes—first it allows the weight of the trailer to be lifted off of the left and right extensions 8 and 37 so they may have the support log 44 moved or replaced.

The middle wheel 75 serves a purpose of allowing the trailer to move on this axis. This would also be important where the low arm 2 is extendable. Referring to FIG. 5, it can be seen that the low arm 2 is divided into two parts. A large low arm 2a and a small low arm 2b. The key to the extension of the low arm 2 is to provide greater separation between the saw 29 and the tree lifter 30.

To accomplish this, the large low arm 2a holds the tree lifter 30 and is mounted on wheels 41 and outriggers 34 for support.

The small low arm 2b extends out of the large low arm 2a by action of low hydraulic cylinder 76 mounted to large low arm 2a pushing out (or pulling in to retreat) low piston arm 77 which pushes against small low arm 2b.

The wheel 75 allows the two portions 2a and 2b of the low arm 2 to move relative to one another when the extension 8 and 37 are retracted. While the wheel 75 is shown only on the middle piston arm 73, wheels may be placed on the left and right piston arms 13, 14. The wheels 73 may be replaced with treads or flat landing gear footings 26.

Power System

A cab 5 above the engine compartment contains the controls for all of the hydraulics in the preferred embodiment.

Below the cab 5, in a tree lifter 30, is a hydraulic motor 44 powered by an engine 43 which sends hydraulic fluid under pressure to valves 45. Valves 45 direct the fluid to a diverter and hydraulic cylinder 46. The valves 45 may send the hydraulic fluid to the outriggers 34 in the manner known in the prior art or to one or more of the cylinders 8, 18, or 38 shown in FIG. 3 or to 72 shown in FIG. 5. Likewise, the fluid may go directly from the valves 45 through extension hydraulic lines 66 to hydraulic cylinder 18 to extend the trailer or in the opposite direction to retract that cylinder 18. Similarly, the fluid may go through leg hydraulic lines 65 to raise or lower the trailer by sending fluid in one direction or the other into the hydraulic cylinder 9. The method of using hydraulics to provide directional control to hydraulic cylinders is well known in the prior art and is not shown with specificity here.

The first high arm 11 and the second high arm 12 can, respectively, slidably hold an inner left tubing 13 and a inner right tubing 14 which are slidable within fixed tubing 11 and fixed tubing 12. Brackets 17 may allow for the inner tubing 13 and 14 to be more tightly held and may be in the form of bearings 17 above or below or around the inner tubing 13 and 14 to allow them to more easily roll in and out of the high arm 11 and 12.

FIG. 1(a) shows how side cylinders 53 may hold pull bars 15a and 15b on either outside side of the top.

Dimensions

In the preferred embodiment, the overall dimensions allow the trailer to be expandable from 42 feet to 46 feet approximately.

The length of the lower arm 2 is usually around 32 feet. It may be 50 inches from the front of the lower arm 2 to the tree lifter 30. The rise from the highest elevation of the support 7 to the lowest elevation is typically from 60 inches to 30 inches. The length of the high arm 11 is approximately seven feet, while the inner tubings 13 and 14 add approximately 48 inches. The pull bar 15 may be a part of this 7 feet.

As can be seen by reference to FIGS. 2 and 3 a back wall 35 having a bottom plate 28 may be used for mounting a second saw 29. In this way, the extending hydraulic cylinder 18 connects on one end to plate 5 of the rising brace 4 (here shown with a left brace 4a and a right brace 4b). The tubing connected to either brace is 8 inch by 16 inch tubing.

As can be seen by reference to FIG. 1 when the trailer is used for harvesting operations, the trailer 1 typically includes outriggers 34 on the tree lifter housing 30 having a tree lifter arm 31 ending in a grapple 32.

Hydraulic landings gears are mounted on the rising brace 4. These consist of a left support arm 7 arms having a left extension arm 8 and a right support arm 9 having a right extension arm 10. The extension arms 8 and 10 are extended using hydraulic pistons with one end attached to the support arm and the other end attached to the extension arm. This allows the customer to set up the de-limber in a shorter period of time and with less danger than with traditional units which require several individuals trying to address the vehicle utilizing fork lift type vehicles known as skidders.

Adjustable landing gear 7 and 8 also allow the customer to load the trailer on a slope or downhill by leveling the trailer.

The controls for the landing gear are preferably in the cab 5 above the tree lifter housing 30. One other improvement is that the operator may maintain the level of the trailer as the supports sink into the ground. This also means that rubber tire skidded is not necessary reposition logs which are typically pushed under traditional landing gear in prior art trailers.

One improvement of the invention over the prior art is to increase dramatically the maneuverability because of the radius of the de-limbing trailer. It also allows for more of the tree to be de-limbed because trees do not necessarily have to have the full length of the trailer to reach the saw, because the saw 28 may be retracted when the tubing 13 and 14 are withdrawn into the first and second high arm 11 and 12.

In addition to the other features described herein, a pull bar 15 is slidably mounted to at least one of the high arm extensions, tubings 13 and 14. This pull bar 15 may be extended beyond the length of the high arm extension tubing 13 and 14 as described above to provide a surface (here a pull attachment 55) for grasping and moving the trailer 1.

Because it may be desirable to narrow the width as well as the length of the trailer, FIGS. 8–11 show how this may be accomplished. In this case, the narrowing of the width of the trailer is accomplished at the front as shown in FIG. 9 by having the first high arm 11 and second high arm 12 move within slots 80 within the rising brace 4. Washers 100 prevent undue friction during the movement and ensure a tight fit. Narrowed portions, neck 81, fit through the slots 80 and are capped with retaining bolts to form heads 11a and 12a. This identical arrangement is provided with smaller parts at the ends as shown in FIGS. 10 and 11.

FIG. 10 shows where inner tubing 13 and 14 have reduced ends 88 which fit through slot 86 in the saw mount 28 and are retained by bolts 13a and 14a.

FIG. 11 shows how pull bars 15a and 15b have reduced ends 89 may fit within the slot 87 in the cross pull bar 54.

A pair of pistons 83 and 84 sharing a common piston arm 85 in the middle may automate this by drawing in or expanding out the parts which move within the slots 80, 86 and 87.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A trailer having a front end and a rear end supported on the ground by at least two wheels and attachable to a vehicle and a powered boom for moving or cutting trees comprising:
   (1) a bed having a front end and a rear end and a left side and a right side and wherein the front end comprises a first attachment means for attaching to the vehicle and a second attachment means for attaching the powered boom;
   (2) a power generator means for generating hydraulic power connected to the powered boom; and
   (3) a leveling means for mechanically leveling the bed comprised of (A) at least one first piston cylinder operationally attached to the power generator means;
   (B) a first piston arm having a low end and a high end, said high end movably extending from the at least one first piston cylinder in response to hydraulic power from the power generator means to lift the rear end relative to the front end; and wherein the at least one first piston cylinder is attached between the front end of the trailer and the rear end of the trailer.

2. The invention of claim 1 wherein
   (A) the at least one first piston cylinder is attached to the left side of the bed and wherein the leveling means further comprises;
   (D) at least one second piston cylinder operationally attached to the power generator means attached to the right side of the bed,
   (1) a second piston arm having a low end and a high end, said high end movably extending from the at least one second piston cylinder.

3. The invention of claim 1 wherein the power generator means comprises a motor, a hydraulic pump connected to the motor, a reservoir connected to the pump and hydraulic fluid in the reservoir mounted on the powered boom and wherein the second attachment means further comprises a hydraulic swivel means for rotationally holding the power generator means and for carrying hydraulic fluid from the hydraulic pump to the at least one hydraulic cylinder.

4. The invention of claim 3 wherein the power generator means further comprises a valve means for selectively supplying hydraulic fluid to the boom means or the at least one first piston cylinder.

5. The invention of claim 4 further comprising a sensing means for sensing the level of the trailer and supplying hydraulic fluid to the at least one first hydraulic cylinder for automatically leveling the trailer.

6. The invention of claim 1 wherein the trailer bed further comprises (1) a low arm having a front end and a rear end and a left side and a right side;
   (2) a rising brace having a high end and a low end and wherein the rising brace low end is attached to the low arm rear end;
   (3) a high arm having a having a left side, a right side, said high arm also having a front end and a rear end and wherein the high arm front end is attached to the rising brace high end;
   (4) a high arm extension means for extending the length of the high arm from the brace outward.

7. The trailer of claim 6 wherein the extension means further comprises at least one extension brace having a front and a rear and a middle, said extension brace being slidably in contact to the high arm rear end.

8. The trailer of claim 7 wherein the extension means further comprises at least one power means for moving the at least one extension brace rear away from the high arm rear end.

9. The trailer of claim 8 wherein the power means further comprises a hydraulic cylinder and piston having a first end operationally movable away by action of the cylinder from the second end, said first end being mounted onto high arm and said second end being attached to the at least one extension brace.

10. The trailer of claim 9 wherein the high arm defines a tubular opening and wherein the at least one extension brace fits within the tubular opening.

11. The trailer of claim 10 wherein the tubular opening is defined outside of the high arm.

12. The trailer of claim 8 wherein the at least one extension brace is on the high arm left side and further comprising at least one second extension brace connected in the same fashion to the high arm right side.

13. The invention of claim 5 wherein the first piston arm low end further comprises a log gripping means for holding the first piston arm low to a log.

14. The invention of claim 1 further comprising at least one second lifting means for lifting the trailer and the leveling means.

* * * * *